United States Patent
Hou

(10) Patent No.: US 10,745,020 B2
(45) Date of Patent: Aug. 18, 2020

(54) METHOD, PROCESSING DEVICE, AND SYSTEM FOR DRIVING PREDICTION

(71) Applicant: Wistron Corporation, New Taipei (TW)

(72) Inventor: Chia-Chang Hou, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/121,630

(22) Filed: Sep. 5, 2018

(65) Prior Publication Data

US 2019/0375420 A1 Dec. 12, 2019

(30) Foreign Application Priority Data

Jun. 6, 2018 (TW) .............................. 107119536 A

(51) Int. Cl.
| | |
|---|---|
| *B60W 50/00* | (2006.01) |
| *B60W 50/14* | (2020.01) |
| *G05D 1/00* | (2006.01) |
| *G05D 1/02* | (2020.01) |
| *G06N 3/08* | (2006.01) |
| *G06N 7/00* | (2006.01) |
| *G06N 5/04* | (2006.01) |
| *G06N 20/00* | (2019.01) |

(52) U.S. Cl.
CPC ........ *B60W 50/0097* (2013.01); *B60W 50/14* (2013.01); *G05D 1/0088* (2013.01); *G05D 1/0214* (2013.01); *G05D 1/0246* (2013.01); *G06N 3/08* (2013.01); *G06N 5/046* (2013.01); *G06N 7/00* (2013.01); *G06N 20/00* (2019.01); *B60W 2050/0028* (2013.01); *B60W 2420/42* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,727,820 B2 | 8/2017 | Ono | |
| 2017/0017927 A1* | 1/2017 | Domnick | ........... G06Q 10/1091 |

(Continued)

FOREIGN PATENT DOCUMENTS

| | | |
|---|---|---|
| JP | 2011014038 | 1/2011 |
| WO | 2018094374 | 5/2018 |

OTHER PUBLICATIONS

Yenikaya et al., "Keeping the Vehicle on the Road—A Survey on On-Road Lane Detection Systems", ACM Computing Surveys, vol. 46, No. 1, Article 2, Oct. 2013, p. 2:1 and 2:7 (Year: 2013).*

(Continued)

*Primary Examiner* — Tamara L Weber
(74) *Attorney, Agent, or Firm* — JCIPRNET

(57) ABSTRACT

A method, a processing device, and a system for driving prediction are proposed. The method is applicable to a processing device configured in a vehicle, where the processing device is connected to an image capturing device and an output device and pre-stores a prediction model. The method includes the following steps. A video sequence around the vehicle is received from the image capturing device. Whether the video sequence satisfies the prediction model is determined so as to update the prediction model according to a driving situation of the vehicle.

15 Claims, 5 Drawing Sheets

(56) References Cited

U.S. PATENT DOCUMENTS

2017/0291602 A1* 10/2017 Newman ............... B60W 50/16
2018/0053102 A1*  2/2018 Martinson ........... B60R 16/0232
2018/0053108 A1*  2/2018 Olabiyi ................. G06N 3/084
2018/0107935 A1*  4/2018 Jeon ...................... G08G 1/012
2019/0205667 A1*  7/2019 Avidan ............... G06K 9/00791

OTHER PUBLICATIONS

"Office Action of Taiwan Counterpart Application", dated Dec. 26, 2018, pp. 1-15.
"Office Action of Japan Counterpart Application," dated Oct. 1, 2019, p. 1-p. 6.

* cited by examiner

ME THOD, PROCESSING DEVICE, AND SYSTEM FOR DRIVING PREDICTION

CROSS-REFERENCE TO RELATED APPLICATION

This application claims the priority benefit of Taiwan application serial no. 107119536, filed on Jun. 6, 2018. The entirety of the above-mentioned patent application is hereby incorporated by reference herein and made a part of this specification.

TECHNICAL FIELD

The disclosure relates to a technique for driving prediction, in particular to, a method, a processing device, and a system for driving prediction.

BACKGROUND

An advanced driver assistance system (ADAS) refers to each type of sensors installed in a vehicle and configured to sense parameters such as light, heat, and pressure and to promptly notify a driver to be cautious on all happenings based on all data collected from inside and outside the vehicle.

However, while the vehicle is driving at high speed, the driver may be more concentrated on front road conditions and less concentrated on side lane conditions, and the determination of the braking distance of the vehicle would normally require considerable driving experience, and whether the vehicle would perform an expected action would be hardly determined. Moreover, the driver's attention may inevitably decrease particularly in a high-speed road way with less winding curves where the driver would have a delayed reaction time on abnormal driving vehicles in front and side lanes or would even be unaware of such abnormal driving vehicles and miss the opportunity to slow down in advance to prevent collision, thereby causing an accident.

SUMMARY OF THE DISCLOSURE

The disclosure is directed to a method, a processing device, and a system for driving prediction.

In an embodiment of the disclosure, the method is applicable to a processing device configured in a vehicle, where the processing device is connected to an image capturing device and an output device and pre-stores a prediction model. The method includes the following steps. A video sequence of a surrounding of the vehicle is received from the image capturing device. Whether the video sequence satisfies the prediction model is determined so as to update the prediction model according to a driving situation of the vehicle.

In an embodiment of the disclosure, the processing device is configured in a vehicle and connected to an image capturing device and an output device. The processing device includes a memory and a processor, where the memory is coupled to the processor. The memory is configured to pre-store a prediction model. The processor is configured to receive a video sequence of a surrounding of the vehicle from the image capturing device and determine whether the video sequence satisfies the prediction model so as to update the prediction model according to a driving situation of the vehicle.

In an embodiment of the disclosure, the system is configured in a vehicle and includes an image capturing device, an output device, and a processing device, where the processing device is connected to the image capturing device and the output device and pre-stores a prediction model. The image capturing device is configured to capture a video sequence of a surrounding of the vehicle. The output device is configured to output a warning signal. The processing device is configured to receive a video sequence of a surrounding of the vehicle from the image capturing device and determine whether the video sequence satisfies the prediction model so as to update the prediction model according to a driving situation of the vehicle.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1A:
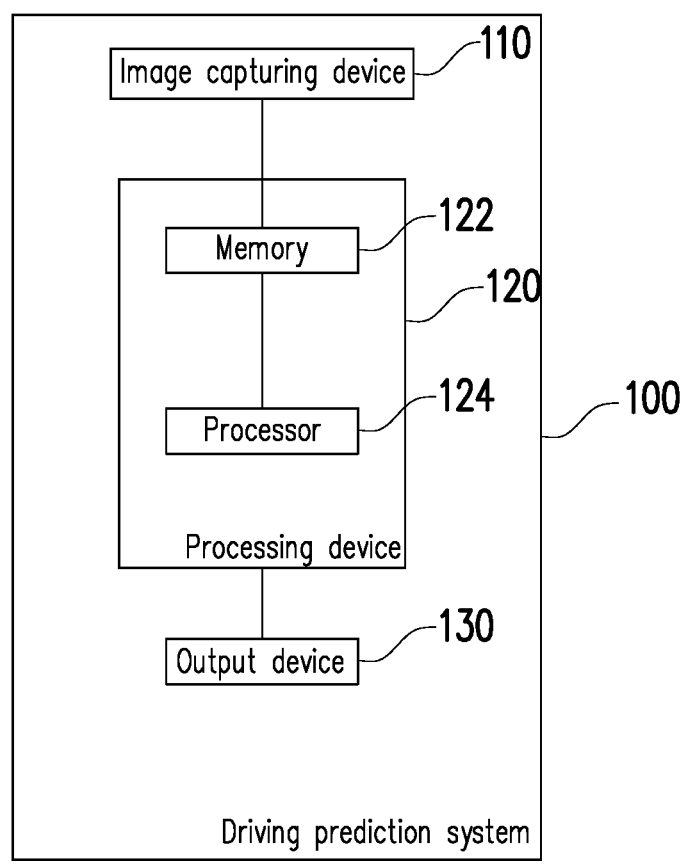
FIG. 1A illustrates a schematic diagram of a driving prediction system in accordance with an embodiment of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1A illustrates a schematic diagram of a driving prediction system in accordance with an embodiment of the disclosure. It should, however, be noted that this is merely an illustrative example and the disclosure is not limited in this regard. All components of the system and their configurations are first introduced in FIG. 1A. The functionalities of the components are disclosed in more detail in the subsequent embodiments.

Referring to FIG. 1A, a driving prediction system 100 would include an image capturing device 110, a processing device 120, and an output device 130, where the driving prediction system 100 may be configured in a vehicle such as a car, a bus, a truck, an electric vehicle, a motorcycle, and so forth.

The image capturing device 110 would be configured to capture and record images of a surrounding of the vehicle (e.g. front images, two-side images, or even rear images of the vehicle). The image capturing device 110 would include a camera lens having an optical lens and sensing elements. The sensing elements are configured to sense light intensity entering the optical lens to thereby generate images. The sensing elements may be, for example, charge coupled device (CCD) elements, complementary metal-oxide semiconductor (CMOS) elements or the like. The number of the image capturing device 110 may be singular or plural to increase the accuracy of prediction. The image capturing device 110 may also be a high-zooming camera lens that capture images that are not easily to be viewed by human eyes.

The processing device 120 would be configured to process images captured by the image capturing device 110 and driving information generated while a driver is driving the vehicle. In the present embodiment, the processing device 120 would at least include a memory 122 and a processor 124. The memory 122 would be configured to store video images, data, and programming codes and may one or a combination of a stationary or mobile random access memory (RAM), a read-only memory (ROM), a flash memory, a hard drive, other similar devices or integrated circuits. The processor 124 would be configured to execute the proposed driving prediction method, and may be, for example, a central processing unit (CPU), a graphic processing unit (GPU) or other programmable devices for general purpose or special purpose such as a microprocessor and a digital signal processor (DSP), a programmable controller, an application specific integrated circuit (ASIC), a programmable logic device (PLD), other similar devices, a combination of above-mentioned devices or integrated circuits.

The output device 130 would be configured to output a warning signal, and may be a speaker that outputs music, speech, or sounds, a screen that displays texts or icons, or a warning light that emits light or flashing light.

Figure 1B:
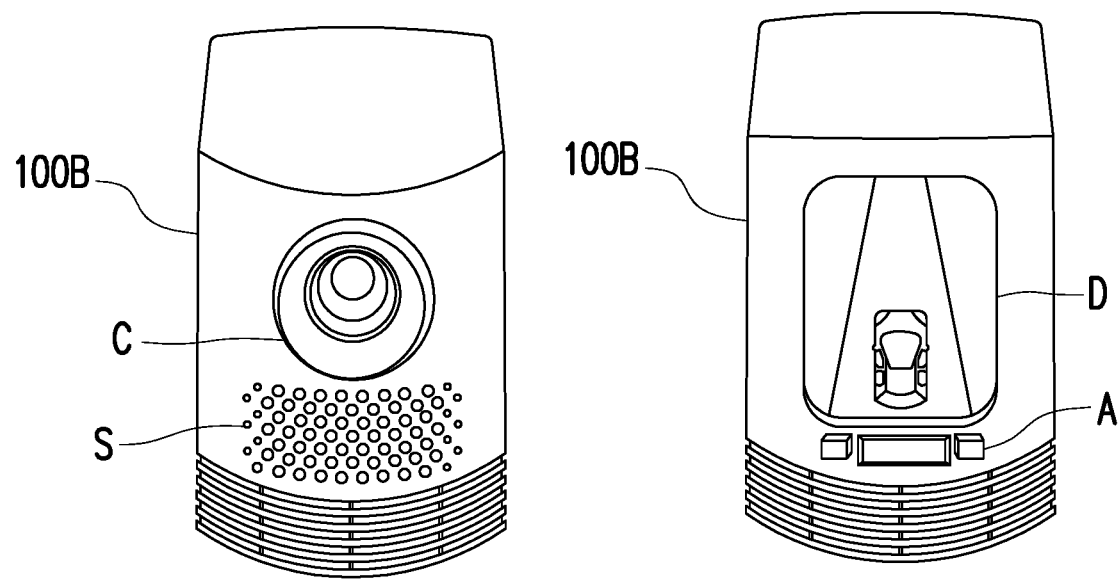
FIG. 1B illustrates a schematic diagram of a driving prediction system in accordance with an embodiment of the disclosure.

It should be noted that, in the present embodiment, the processing device 120, the image capturing device 110 and the output device 130 may be integrated as an all-in-one device and configured at, for example, any position on a windshield. To be specific, the driving prediction system 100 in FIG. 1A may be implemented as a driving prediction system 100B illustrated in FIG. 1B in accordance with an embodiment of the disclosure, where a front view and a back view of the driving prediction system 100B are respectively illustrated at the left-hand side and the right-hand side in FIG. 1B. The image capturing device 110 in FIG. 1A may be implemented as a camera module C in the driving prediction system 100B in FIG. 1B. The processing device 120 in FIG. 1A may be implemented as a controller (not shown) in the driving prediction system 100B in FIG. 1B. The output device 130 in FIG. 1A may be implemented as a screen D, a warning light A, and a speaker S in the driving prediction system 100B in FIG. 1B.

Figure 1C:
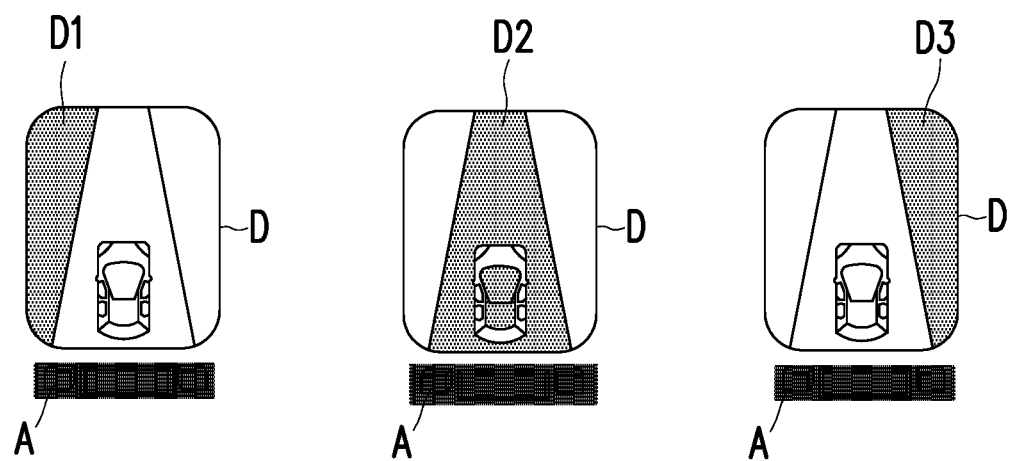
FIG. 1C illustrates a schematic diagram of three driving prediction scenarios in accordance with an embodiment of the disclosure.

For example, FIG. 1C illustrates a schematic diagram of three driving prediction scenarios in accordance with an embodiment of the disclosure. When the driving prediction system 100B determines that an early warning on a left lane is required, the warning light A would flash, and the speaker S would output a warning speech, and the screen D corresponding to a region of the left lane D1 would be lighted so as to warn the driver. Similarly, when the driving prediction system 100B determines that an early warning on a current lane is required, the warning light A would flash, and the speaker S would output a warning speech, and the screen D corresponding to a region of the current lane D2 would be lighted. When the driving prediction system 100B determines that an early warning on a right lane is required, the warning light A would flash, and the speaker S would output a warning speech, and the screen D corresponding to a region of the right lane D3 would be lighted. The driving prediction system 100B would provide the driver to customize the warning output based on usage habit as known per se. The disclosure is not limited in this regard.

In another embodiment, the processing device 120 may be wired or wirelessly connected to the image capturing device 110 and the output device 130. The image capturing device 110 and the output device 130 may be configured in the vehicle, and the processor 120 may be an electronic device with a computing feature such as a smart phone, a tabular computer, an in-vehicle computer. The disclosure is not limited in this regard.

Figure 2:
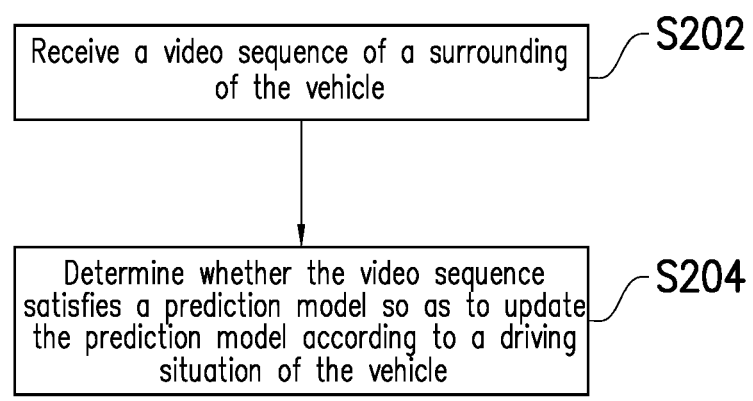
FIG. 2 illustrates a flowchart of a driving prediction method in accordance with an embodiment of the disclosure.

FIG. 2 illustrates a flowchart of a driving prediction method in accordance with an embodiment of the disclosure, where the flow in FIG. 2 may be implemented by the driving prediction system 100 in FIG. 1. In the present embodiment, the memory 122 would pre-store a prediction model. Such prediction model would be a classifier trained by multiple driving videos through machine learning and used to predict any potential danger for the front road driving condition of the vehicle. The driving videos used for training would include normal and abnormal driving situations of vehicles as well as scenarios before and after accidents. The details of the prediction model would be provided in the subsequent embodiments.

Referring to both FIG. 1 and FIG. 2, the processor 124 of the processing device 120 would receive a video sequence of a surrounding of the vehicle from the image capturing device (Step S202). Herein, the video sequence captured by the image capturing device 110 may be, for example, image frames of a near front lane and near side lanes with less than 50 m away from the vehicle as well as image frames of a distant front lane and distant side lanes with more than 50 m away from the vehicle. Next, the processor 124 would determine whether the video sequence satisfies the prediction model so as to update the prediction model according to a driving situation of the vehicle (Step S204). In detail, the processor 124 would perform feature comparison on the image frames of the video sequence and the prediction model through image analysis as known per se to accordingly determine whether the video sequence satisfies the prediction model. For example, the classifier of the prediction model may determine whether there exists any dangerous road condition such as zig-zag driving, overtake, slamming on the brakes, racing, insufficient drive distance caused by dangerous driving behaviors of the vehicle itself or surrounding vehicles. Next, the processor 124 would further update the prediction model based on whether the video sequence satisfies the prediction model and the driving situation of the vehicle.

In the present exemplary embodiment, when the processor 124 determines that the video sequence satisfies the prediction model, it would control the output device 130 to output a warning signal and update the prediction model according to the driving situation of the vehicle. In detail, when the processor 124 determines that the video sequence satisfies any preset dangerous road condition of the prediction model, it would prompt the driver through the warning signal to perform a preventive response such as slowing down, braking, turning, or changing lane. Next, the processor 124 would determine the driver's actual response on the provided warning signal based on the driving status of the vehicle to accordingly update the prediction model stored in the memory 122.

On the other hand, when the video sequence does not satisfy the prediction model, the processor 124 would update the prediction model according to the driving status of the vehicle. In detail, when the processor 124 determines that the video sequence does not satisfy the prediction model, which means that the processor 124 is not able to determine whether there exists any preset dangerous road condition in the current road condition, the processor 124 would still determine whether the driver has an abnormal driving behavior based on the driving status of the vehicle to update the prediction model stored in the memory 122. In other words, the processor 124 would improve the original prediction model based on all driving responses on the warning signal and general driving behaviors in order to generate a prediction model that is more customized to the driver's driving habit. For example, the sensitivity that triggers the output device 130 to provide the warning signal may be adjusted. Details of the implementation would be provided later on.

Figure 3:
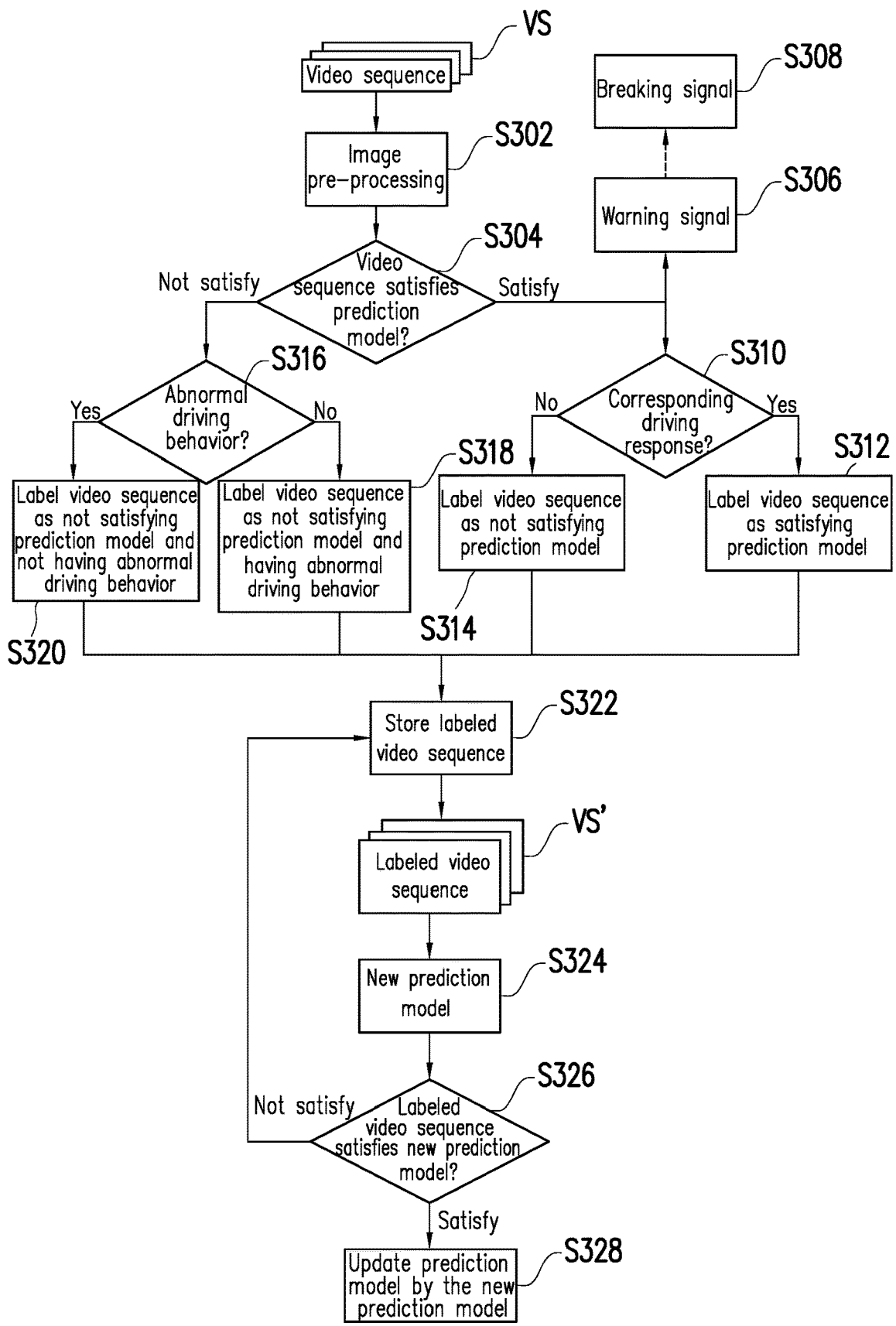
FIG. 3 illustrates a flowchart of a driving prediction method in accordance with another embodiment of the disclosure.

For better comprehension, actual applications and details of FIG. 2 would be described in FIG. 3 which illustrates a flowchart of a driving prediction method in accordance with another embodiment of the disclosure. The flow in FIG. 3 may also be implemented by the display system 100.

Referring to both FIG. 1 and FIG. 3, the processor 124 of the processing device 120 would receive a video sequence VS of a surrounding of a vehicle from the image capturing device 110 and perform image pre-processing such as focusing adjustment, white balance adjustment, exposure adjustment, and cropping on the video sequence VS (Step S302) so as to speed up the subsequent image processing process.

Next, the processor 124 would determine whether the video sequence VS satisfies the prediction model (Step S304) to perform comparison between image frames of the video sequence VS and the prediction model of a classifier and to thereby perform classification based on the determination result. As described in the previous embodiment, the memory 122 would store a prediction model corresponding to each driving behavior such as zig-zag driving, overtake, slamming on the brakes, racing, insufficient drive distance, and the classifier may determine the class that the video sequence VS belongs to according to whether the video sequence VS satisfies the prediction model.

When the processor 124 determines that the video sequence VS satisfies the prediction model, it would control the output device 130 to output a warning signal (Step S306) to thereby prompt the driver to perform a preventive response such as slowing down, braking, turning, changing lane. Moreover, the processor 124 may optionally generate a braking signal of a vehicle braking system (Step S308) such as intervening into a breaking system to output a braking notification, intervening into a turn signal system to send out a turn signal notification. Next, the processor 124 would determine whether the vehicle has a corresponding driving status according to the warning signal to thereby determine whether the driver has a corresponding driving response (Step S310). When the vehicle has the driving status according to the warning signal (i.e. the driver has the corresponding driving response according to the warning signal), the processor 124 would label the video sequence VS as "satisfying the prediction model" (Step S312).

Herein, when the vehicle does not have the corresponding driving status according to the warning signal (i.e. the driver does not have the corresponding driving response according to the warning signal), that is, when the video sequence VS satisfies the prediction model and yet the driver's response does not satisfy the prediction model (i.e. driving behavior is unchanged), the processor 124 would label the video sequence VS as "not satisfying the prediction model" (Step S314). It should be noted that, when the processor 124 determines that the video sequence VS satisfies the prediction model but does not control the output device 130 to provide the warning signal (i.e. the processor 124 determines that the video sequence VS indicates a normal driving with no necessity of warnings and that the driver performs a preventive response so that the driving status of the vehicle changes), the video sequence VS would also be labeled as "not satisfying the prediction model".

On the other hand, when the processor 124 determines that the video sequence VS does not satisfy the prediction in Step S306, the processor 124 would determine whether the driving status of the vehicle changes to accordingly determine whether the driver has an abnormal driving behavior (Step S316). Herein, the processor 124 would determine that the video sequence VS does not satisfy the prediction model in a condition where the video sequence VS is not able to be classified based on the prediction model. The reason is that training data of the prediction model is limited and is not able to cover all driving conditions. Therefore, when the classification is performed on such video sequence, image satisfaction scores would all be low. In such condition, the processor 124 would determine whether the driver has an abnormal driving behavior such as slowing down, braking, turning, changing lane.

When the driving status of the vehicle does not change (i.e. the driver does not have any abnormal driving behavior), the processor 124 would label the video sequence VS as "not satisfying the prediction model and not having any abnormal driving behavior" (Step S318). In other words, this can be viewed as a normal driving situation. When the driving status of the vehicle changes (i.e. the driver has an abnormal driving behavior), the processor 124 would label the video sequence VS as "not satisfying the prediction model and having an abnormal driving behavior" (Step S320). In other words, this can be viewed as an abnormal driving situation, and the processor 124 may further label the driving behavior of the video sequence VS.

The processor 124 would store the labeled video sequence into the memory 122 (Step S322) as a basis of updating the prediction model in the subsequent steps. In other words, the basis of updating the prediction model would include the video sequences labeled as "satisfying the prediction model" in Step S312, labeled as "not satisfying the prediction model" in Step S314, "not satisfying the prediction model and not having any abnormal behavior" in Step S316, and "not satisfying the prediction model and having an abnormal behavior" in Step S320.

Next, the flow would enter a prediction model training stage. Such stage may be performed in real time while the vehicle is running or may be performed in offline while the vehicle is not running depending on the performance of the processor 124. The processor 124 would generate a new prediction model by leveraging a machine learning algorithm based on labeled video sequence VS' stored in the memory 122 and the prediction model (Step S324). Herein, the processor 124 may generate one or more fine-tuning parameters of the prediction model or reconstruct the prediction model based on a neural network model, where the neural network model may be a recurrent neural network (RNN) model that is suitable to train video sequences with temporal association for deep learning. However, the disclosure is not limited in this regard.

Next, the processor 124 would determine whether the labeled video sequence VS' satisfy the new prediction model (Step S326) in order to test and validate the new prediction model. When the processor 124 determines that the labeled video sequence VS' satisfies the new prediction model, it would update the prediction model by the new prediction model (Step S328) and store the new prediction model into the memory 122. When the processor 124 determines that the labeled video sequence VS' does not satisfy the new prediction model, it would still store such labeled video sequence VS' into the memory 122 as improvement data. The reason of not satisfying the new prediction model may be due to insensitivity in determining the video sequence VS' based on the classification methodology of the new prediction model or due to insufficient data amount to change the parameters of the original prediction model.

Figure 4:
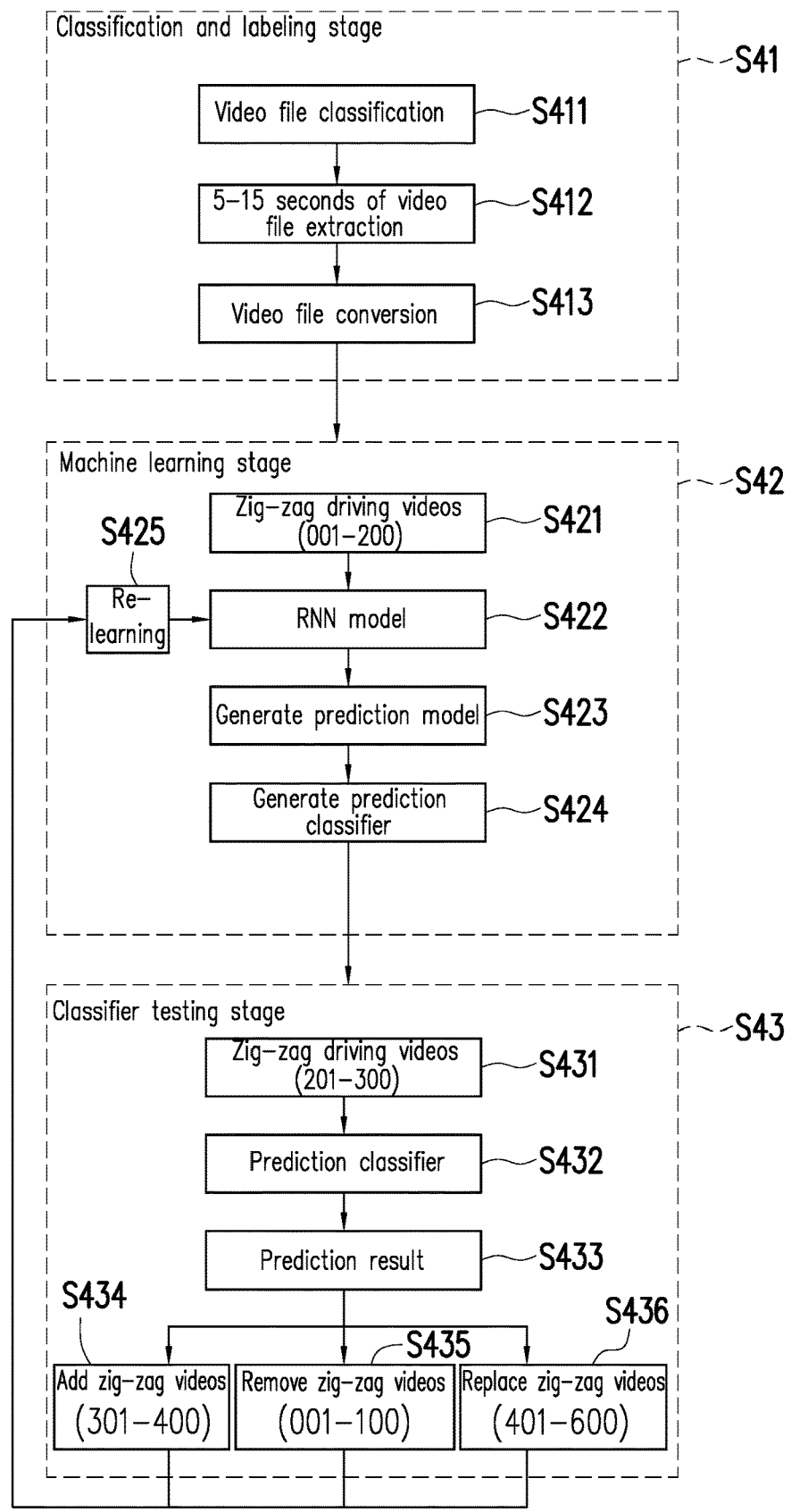
FIG. 4 illustrates a flowchart of a prediction model constructing method in accordance with an embodiment of the disclosure.

FIG. 4 illustrates a flowchart of a prediction model constructing method in accordance with an embodiment of the disclosure.

First, in a classification and labeling stage S41, the processor 124 of the processing device 120 would obtain video files and perform video file classification (Step S411), where the categories of these video files may be video files that include known dangerous driving categories such as zig-zag driving, overtake, slamming on the brakes, racing, insufficient drive distance as well as normal video files with no accident. Next, the processor 124 would perform 5-15 seconds of video file extraction on the video files in each category (Step S412), where the extracted video files would at least include consecutive frames of before an accident occurs, during the accident, and when the accident ends. Next, the processor 124 would perform video file conversion (Step S413) such that the extracted video files would be converted to, for example, 30 fps image files, and the processor 124 would use a massive amount of files with same category labels but different types of accidents as training materials for machine learning. That is, the processor 124 would use training video sequences having different dangerous road conditions and normal road conditions to train a neural network in order to construct the prediction model. A zig-zag driving prediction model construction would be illustrated in the present embodiment, and others may be deduced in a similar fashion.

In a machine learning stage S42, the processor 124 would obtain zig-zag driving videos with file numbers 001-200 (Step S421), train these video files by using a RNN model (Step S422) to generate a prediction model (Step S423), and thereby generate a prediction classifier corresponding to zig-zag driving (Step S424).

Next, in a classifier testing stage S43, the processor 124 would obtain zig-zag driving videos with file numbers 201-300 (Step S431), set these as test videos, and input the test videos into a prediction classifier (Step S432) to obtain a prediction result (Step S433), and thereby validate the prediction classifier. The processor 124 may select to add zig-zag driving videos with file numbers 301-400 (Step S434), to remove the zig-zag driving videos with file numbers 001-200 (Step S435), or to replace zig-zag driving videos with file numbers 401-600 for re-learning the prediction classifier (Step S425).

In terms of actual applications on the zig-zag driving prediction classifier, when the processor 124 determines that a front vehicle has a zig-zag dangerous driving behavior (i.e. the video sequence has a feature that satisfies zig-zag driving), it would set a score threshold that triggers the output device 130 to provide the warning signal to 80 points, where no warning would be provided for any score below 80 points, and the warning would be provided for any score including and over 80 points. When the processor 124 determines that zig-zag dangerous driving warnings have been provided several times and yet the driver does not have any driving response such as slowing down or turning a steering wheel, the processor 124 would adjust the score threshold that triggers the output device 130 to provide the warning signal to 81 points, where no warning would be provided for any score below 81 points, and the warning would be provided for any score including and over 81 points. The processor 124 would continue adjusting the score threshold until the driver responds, for example, at 85 points. This mean that the driver would only have the driving response when the score reaches 85 points almost every time. Accordingly, the processor 124 may gradually adjust the warning sensitivity that trigger the output device 130 to provide the warning signal that is suitable for the driver to respond to zig-zag driving in the front. In the present embodiment, the score threshold adjustment from 80 points to 85 points would indicate a decrement on the warning sensitivity in zag-zag driving. Hence, the updated prediction model would be much closer to the driver on the warning sensitivity in potential danger and namely much closer to the driver's driving habit.

However, after a certain period of time, the processor 124 would lower the score threshold to 84 points for driving safety enhancement, and the reasons are provided as follows. First, since a long driving time may decrease the capability of the driver's driving response, the warning sensitivity of the driving prediction system 100 in zig-zag driving would be increased for driving safety enhancement. Second, to avoid the warning sensitivity of the driving prediction system 100 in zig-zag driving always being set to low, an increment testing would be thus performed. For example, when the score is adjusted to 84 points and when the driver responds, it means that the increment on the warning sensitivity in zig-zag driving is valid. Third, after the score threshold is decreased until the driver no longer responds, the score threshold would be increased so that an automatic adjustment that is closer to the driving behavior would be provided by the driving prediction system 100.

In summary, the method, the processing device, and the system for driving prediction proposed in the disclosure would monitor and predict a road condition based on real-time images of a surrounding of a vehicle as well as a prediction model constructed based on a driving behavior of a driver. A warning would be provided to the driver before he/she is alerted so as to predict and prevent the occurrence of any crash or collision accident.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A processing device, connected to an image sensor configured in a vehicle, comprising:
    a memory, configured to pre-store a prediction model; and
    a processor, coupled to the memory, configured to:
        receive a video sequence of a surrounding of the vehicle from the image sensor;
        determine whether the video sequence satisfies the prediction model; and
        in response that the video sequence satisfies the prediction model, output a warning signal and update the prediction model according to a response of the vehicle operated by a driver on the warning signal based on a driving situation of the vehicle.

2. The processing device according to claim 1, wherein the processor is further configured to:
    in response that the video sequence does not satisfy the prediction model, update the prediction model according to the driving situation of the vehicle.

3. The processing device according to claim 2, wherein the processor updates the prediction model by adjusting a sensitivity to trigger the warning signal.

4. The processing device according to claim 2, wherein in response that the video sequence does not satisfy the prediction model,
    the processor determines whether a driving status of the vehicle changes so as to accordingly label the vehicle and thereby generate a labeled video sequence and
    updates the prediction model according to the labeled video sequence.

5. The processing device according to claim 4, wherein:
    in response that the driving status of the vehicle changes, the processor labels the video sequence as not satisfying the prediction model and having an abnormal driving; and
    in response that the driving status of the vehicle does not change, the processor labels the video sequence as satisfying the prediction model and not having the abnormal driving.

6. The processing device according to claim 2, wherein in response that the video sequence satisfies the prediction model, the processor is further configured to:
    control a braking system of the vehicle.

7. The processing device according to claim 1, wherein the prediction model is associated with a plurality of dangerous road conditions, and wherein
    the processor determines whether the prediction model is able to determine whether there exists any of the dangerous road conditions in the video sequence by using the prediction model to thereby determine whether the video sequence satisfies the prediction model.

8. The processing device according to claim 1, wherein in response that the video sequence satisfies the prediction model,
    the processor determines whether the vehicle has a corresponding driving status according to the warning signal so as to accordingly label the video sequence and thereby generate a labeled video sequence and
    updates the prediction model according to the labeled video sequence.

9. The processing device according to claim 8, wherein
    in response that the vehicle has the corresponding driving status according to the warning signal, the processor labels the video sequence as satisfying the prediction model; and
    in response that the vehicle does not have the corresponding driving status according to the warning signal, the processor labels the video sequence as not satisfying the prediction model.

10. The processing device according to claim 8, wherein
    in response that the video sequence satisfies the prediction model and the warning signal is not outputted, the processor further labels the video sequence as not satisfying the prediction model in response to a change of the driving status of the vehicle.

11. The processing device according to claim 1, wherein the processor is further configured to:
    obtain a plurality of training video sequences comprising a plurality of different dangerous road conditions and normal road conditions so as to accordingly train a neural network and thereby generate the prediction model.

12. The processing device according to claim 1, wherein the processor is further configured to:
    obtain at least one labeled video sequence, wherein each of the at least one labeled video sequence is labeled as whether satisfying the prediction model;
    generate a new prediction model according to the at least one labeled video sequence and the prediction model; and
    determine whether the at least one labeled video sequence satisfies the new prediction model so as to accordingly determine whether to update the prediction model.

13. The processing device according to claim 12, wherein:
    in response that the at least one labeled video sequence satisfies the new prediction model, the processor updates the prediction model by the new prediction model; and
    in response that the at least one labeled video sequence does not satisfy the new prediction model, the processor does not update the prediction model.

14. The processing device according to claim 1, wherein the processor updates the prediction model by adjusting a sensitivity to trigger the warning signal.

15. A system for driving prediction configured in a vehicle, and comprising:
    an image capturing device, configured to capture images;
    an output device, configured to output a warning signal; and
    a processing device, connected to the image capturing device and the output device, and configured to:
        receive a video sequence of a surrounding of the vehicle from the image capturing device;
        determine whether the video sequence satisfies the prediction model; and
        in response that the video sequence satisfies the prediction model, control the output device to output a warning signal and update the prediction model according to a response of the vehicle operated by a driver on the warning signal based on a driving situation of the vehicle.

* * * * *